(12) United States Patent
Douglas (10) Patent No.: US 10,239,141 B2
(45) Date of Patent: Mar. 26, 2019

(54) FORMING A COMPLEXLY CURVED METALLIC SANDWICH PANEL

(71) Applicant: Hamilton Sundstrand Corporation, Windsor Locks, CT (US)

(72) Inventor: Alan R. Douglas, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 402 days.

(21) Appl. No.: 14/511,767

(22) Filed: Oct. 10, 2014

(65) Prior Publication Data

US 2015/0102128 A1    Apr. 16, 2015

Related U.S. Application Data

(60) Provisional application No. 61/889,370, filed on Oct. 10, 2013.

(51) Int. Cl.
| | |
|---|---|
| *B23K 1/00* | (2006.01) |
| *B23K 31/02* | (2006.01) |
| *B21D 26/021* | (2011.01) |
| *B21D 26/051* | (2011.01) |
| *B21D 26/055* | (2011.01) |
| *B21D 47/00* | (2006.01) |
| *B21D 47/04* | (2006.01) |

(Continued)

(52) U.S. Cl.
CPC .......... *B23K 1/0018* (2013.01); *B21D 26/021* (2013.01); *B21D 26/051* (2013.01); *B21D 26/055* (2013.01); *B21D 47/00* (2013.01); *B21D 47/04* (2013.01); *B21D 53/92* (2013.01); *B23K 31/02* (2013.01); *F02K 1/54* (2013.01); *F05D 2230/232* (2013.01); *F05D 2230/236* (2013.01); *F05D 2230/237* (2013.01); *F05D 2300/133* (2013.01); *Y02T 50/672* (2013.01)

(58) Field of Classification Search
CPC .. B21D 26/055; B21D 26/021; B21D 26/053; B23K 20/023; B23K 2201/18; B23K 20/18; B23K 2201/02; B23K 26/037; B23K 26/24; B23K 26/244
USPC .......................... 228/157, 265, 190; 428/116
See application file for complete search history.

(56) References Cited

U.S. PATENT DOCUMENTS

| | | |
|---|---|---|
| 2,609,068 A | 9/1952 | Pajak |
| 2,988,809 A | 6/1961 | Hall |
| 3,053,969 A | 9/1962 | Kerr |

(Continued)

FOREIGN PATENT DOCUMENTS

| | | | |
|---|---|---|---|
| JP | 2011171569 A | * | 9/2011 |
| WO | 87/01650 | | 3/1987 |
| WO | 03/055618 | | 7/2003 |

OTHER PUBLICATIONS

Computer english translation JP 2011171569 A.*

(Continued)

*Primary Examiner* — Erin B Saad
(74) *Attorney, Agent, or Firm* — O'Shea Getz P.C.

(57) ABSTRACT

Aspects of the disclosure are directed to a bonding of a first skin and a second skin to a core material, coupling a sheet to the first skin to form with the first skin an enclosure containing the second skin and the core material, exposing the first skin, the second skin, and the core material to heat, and based on the exposition of heat, applying pressure via the enclosure to the first skin to cause the first skin to deform and expand to a shape of a die.

19 Claims, 6 Drawing Sheets

(51) Int. Cl.
*B21D 53/92* (2006.01)
*F02K 1/54* (2006.01)

(56) References Cited

U.S. PATENT DOCUMENTS

| | | | |
|---|---|---|---|
| 3,067,507 | A | 11/1962 | Kern |
| 3,927,817 | A * | 12/1975 | Hamilton .............. B21D 26/055 228/157 |
| 3,930,605 | A | 1/1976 | Merrill et al. |
| 5,139,887 | A * | 8/1992 | Sutton .................... B21D 47/00 428/586 |
| 5,246,520 | A | 9/1993 | Scanlon |
| 5,383,518 | A * | 1/1995 | Banks ..................... F28D 9/005 165/166 |
| 5,705,794 | A * | 1/1998 | Gillespie .............. B21D 26/021 219/604 |
| 6,179,943 | B1 | 1/2001 | Boeing |
| 6,810,572 | B2 | 11/2004 | Kistner |
| 8,529,720 | B2 | 9/2013 | Goldfinch |
| 2004/0175554 | A1 | 9/2004 | Clifford |
| 2008/0083210 | A1 | 4/2008 | Sternberger et al. |
| 2011/0297325 | A1 | 12/2011 | Maheshwari |
| 2012/0291416 | A1 * | 11/2012 | Chiou ....................... F02K 1/60 60/226.2 |

OTHER PUBLICATIONS

International search report for PCT/US2014/060064 dated Jan. 7, 2015.
Wikipedia, "Sandwich-structured composite", accessed on Oct. 8, 2014, downloaded from <http://en.wikipedia.org/wiki/Sandwich-structured_composite>.
Hexcel Composites, "HexWeb Honeycomb Sandwich Design Technology", Publication No. AGU 075b, Dec. 2000, downloaded from <http://www.hexcel.com/Resources/DataSheets/Brochure-Data-Sheets/Honeycomb_Sandwich_Design_Technology.pdf>.
Faa, "Regulation Policies Handbooks Manuals—Advanced Composite Materials", Chapter 7, accessed on Oct. 8, 2014, downloaded from <https://www.faa.gov/regulations_policies/handbooks_manuals/aircraft/amt_airframe_handbook/media/ama_Ch07.pdf>.
Jeff D. Will et al., "Superplastic Forming/Adhesive Bonding of Aluminum (SPF/AB) Multi-Sheet Structures", NASA/CR-2003-212400, May 2003, downloaded from <http://ntrs.nasa.gov/archive/nasa/casi.ntrs.nasa.gov/20030056633.pdf>.

* cited by examiner

FORMING A COMPLEXLY CURVED METALLIC SANDWICH PANEL

CROSS-REFERENCE TO RELATED APPLICATIONS

This application claims the benefit of U.S. Provisional Application No. 61/889,370, filed Oct. 10, 2013.

TECHNICAL FIELD

Aspects of the disclosure are directed to manufacturing processes for metallic sandwich panels made up of face skins and an inner core, and more specifically manufacturing processes for forming complexly curved metallic sandwich panels.

BACKGROUND

Figure 1:
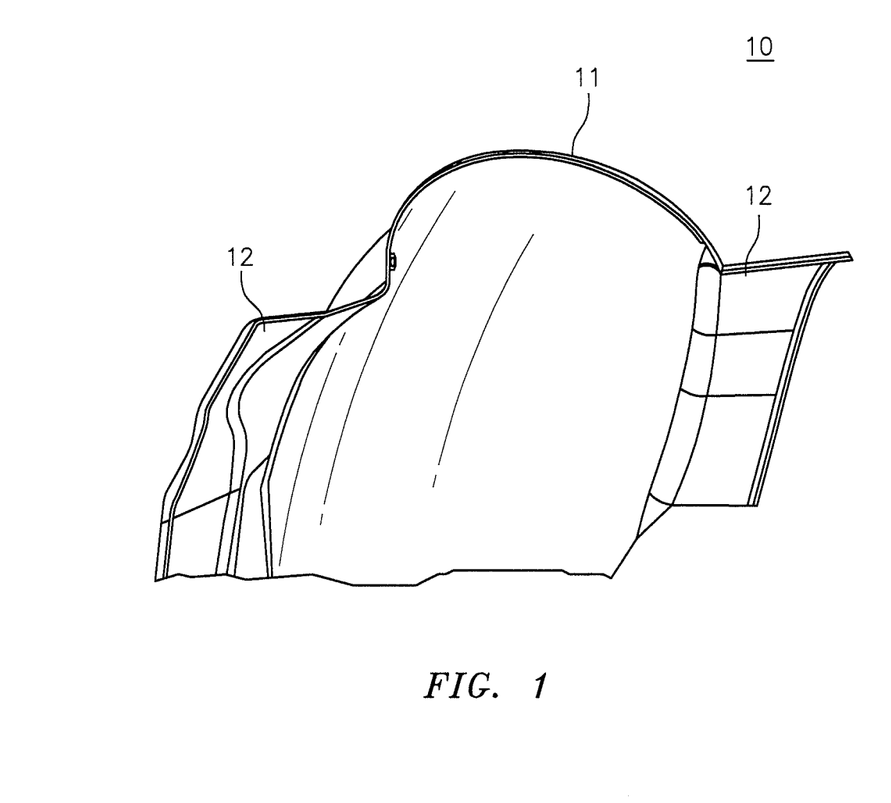
FIG. 1 is an exemplary view of an inner fixed structure panel, including a general view of a design model for a titanium IFS panel.

FIG. 1 illustrates an inner fixed structure (IFS) 10 which is part of a thrust reverser assembly for a turbofan propulsion system for a commercial jetliner. Currently, many IFSs are formed as a carbon fiber composite component, with two carbon fiber reinforced face skins sandwiching a honeycomb core grid of aluminum in between and bonded together to form a panel in a known manner. Such an IFS cannot withstand high temperatures due to the composite face skins. To alleviate this limitation, an IFS can be protected using thermal blankets, but the blankets are costly, difficult to work with, and add weight.

The IFS illustrated in FIG. 1 is typical, with an inner barrel section 11, and two bifurcation panels 12 integrally formed with or fastened or bonded to the barrel section 11.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method comprising: bonding a first skin and a second skin to a core material, coupling a sheet to the first skin to form with the first skin an enclosure containing the second skin and the core material, exposing the first skin, the second skin, and the core material to heat, and based on the exposition of heat, applying pressure via the enclosure to the first skin to cause the first skin to deform and expand to a shape of a die. In some embodiments, the pressure is applied when the first skin, the second skin, and the core material reach a threshold temperature suitable for super plastic forming. In some embodiments, the pressure is applied through the insertion of an inert gas into the enclosure. In some embodiments, at least one of the core material includes holes between cells or the second skin is perforated. In some embodiments, the heat is applied using a vacuum furnace. In some embodiments, the method comprises removing excess material from a perimeter of the first skin, and decoupling the sheet from the first skin. In some embodiments, the bonding comprises at least one of welding, brazing, or diffusion bonding. In some embodiments, the bonding occurs inside a forming tool configured to cause the first skin to deform and expand to the shape of the die, and the method comprises raising the pressure of air outside of the enclosure to bond the first and second skins and the core material. In some embodiments, the method comprises evacuating the enclosure of air. In some embodiments, the evacuation of the enclosure occurs prior to the exposition of heat. In some embodiments, the method comprises forming at least one of the first skin, the second skin, or the core material out of titanium. In some embodiments, the method comprises forming the first skin, the second skin, and the core material out of titanium.

In some embodiments, one or more structures are formed via one or more methods. In some embodiments, an inner fixed structure of a thrust reverser comprising a barrel portion is formed. In some embodiments, the inner fixed structure comprises bifurcation panels bonded to the barrel portion. In some embodiments, an engine exhaust structure is formed.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using an IFS. An IFS could be formed as an all-metallic sandwich panel using the technique described herein. The sandwich panel construction could include titanium face sheets sandwiching a titanium honeycomb (or other shape) core grid, all bonded together to form a rigid panel that is more resistant to high temperatures. Other metals might also be advantageous, and can be selected to suit the application.

The following process applies to forming the barrel portion 11 of the IFS 10 of FIG. 1. The separately formed barrel portion 11 may later be bonded to the bifurcation panels 12 in a separate step to form a complete IFS 10.

First, the inner skin 21 and outer skin 22 of the barrel portion would be formed into a cylindrical shape, using an appropriate cold forming process such as roll forming, as may be selected by a person skilled in this art. Other shapes or geometries may be used, such as a conical shape, a half of a cylinder, a section of a cone, etc.

Next, the inner and outer skins 21, 22 would be laid-up together with the core grid material 23, and bonded together to form a rigid, cylindrical (or conical, etc. depending upon the shape of the previously shaped skins 21, 22) panel structure 20, which will function as a preform for the next process step. Bonding techniques may include welding, brazing or diffusion bonding, as may be appropriate and selected by a person of ordinary skill in this art. This bonding process to than this preform panel 20 may be conducted in a known manner separately from the next step, or it may occur integrally with the next step and in the same tooling, as will be described in further detail below.

Figure 2:
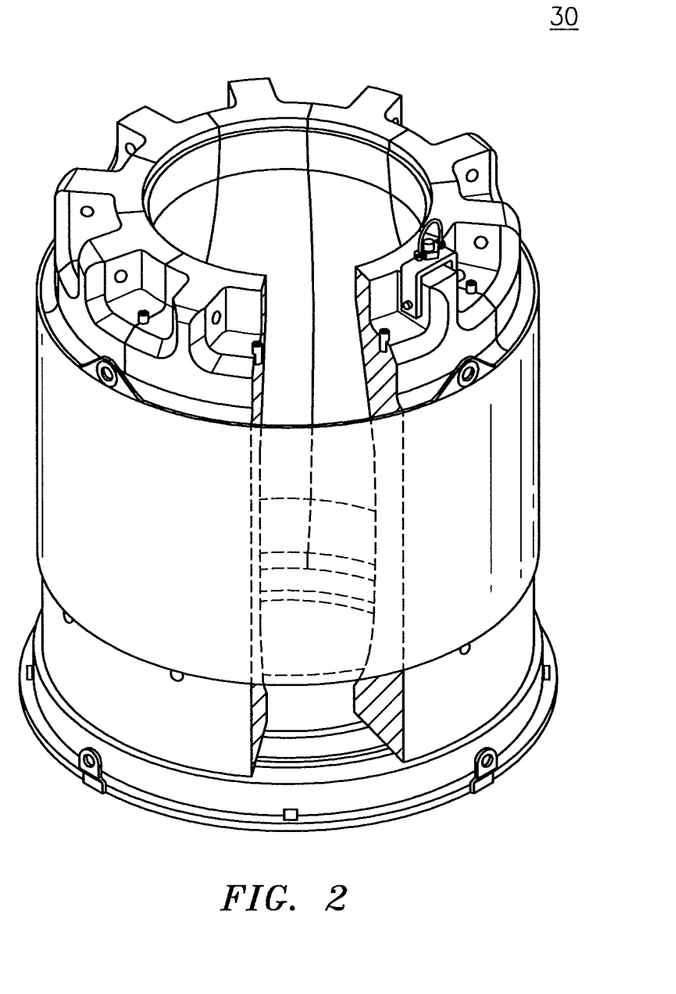
FIG. 2 is a schematic view of a tool for super plastically forming a bonded metallic sandwich panel therein into a complexly curved shape, including a general view of a tool design for forming titanium panels.
Figure 3:
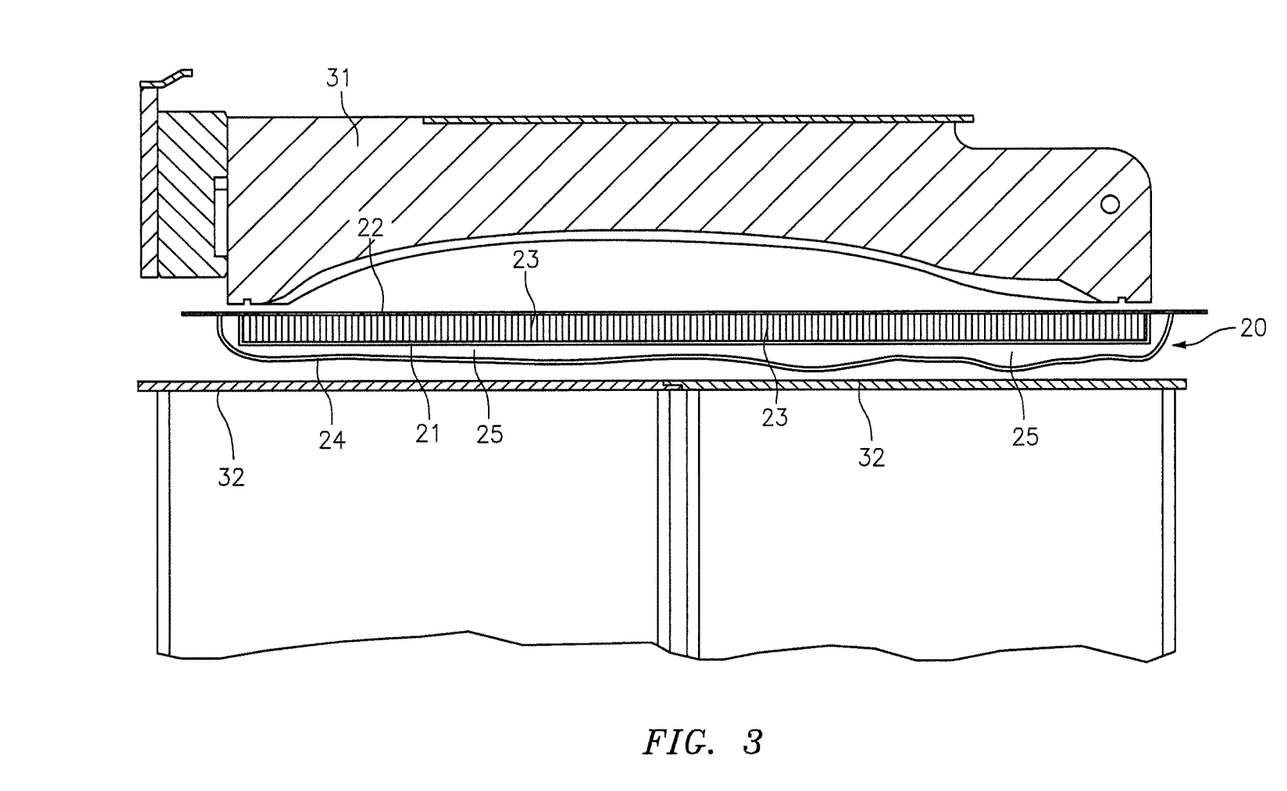
FIG. 3 is a cross-sectional, schematic view of the tool of FIG. 2, with a metallic bonded sandwich panel preform positioned therein, including a line drawing illustrating the tool and part prior to forming.
Figure 4:
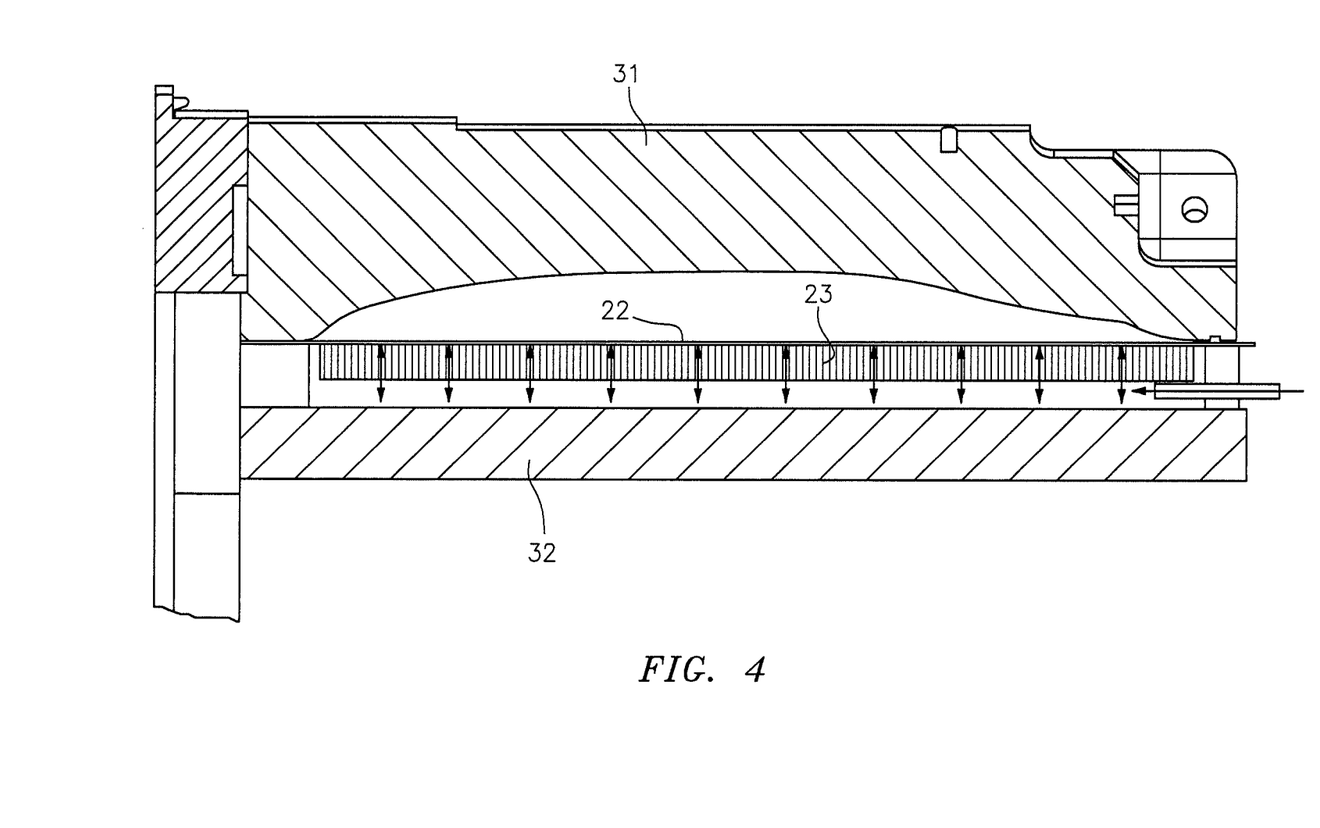
FIG. 4 depicts another illustration of the tool and part of FIG. 3 prior to forming.
Figure 5:
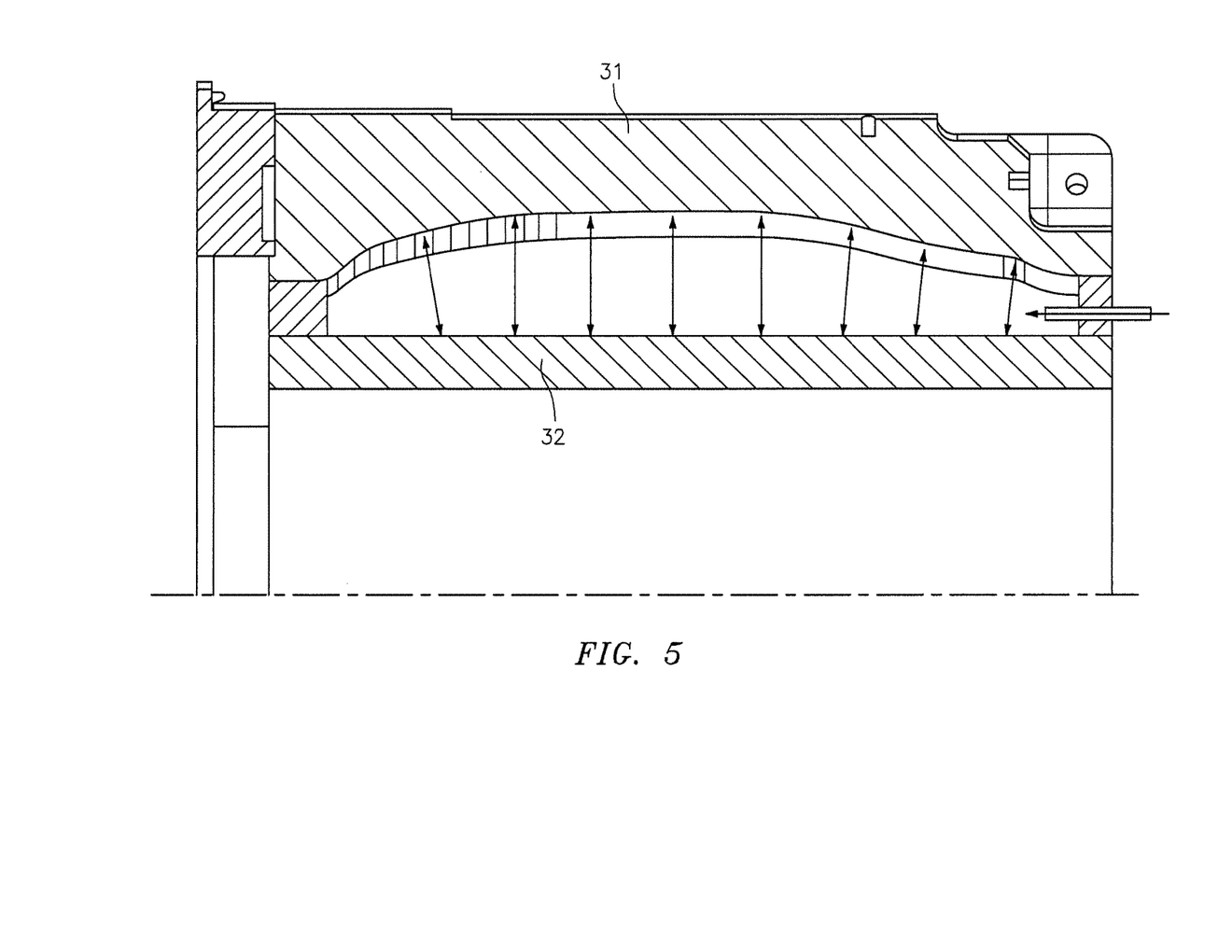
FIG. 5 depicts an illustration of the tool and part after forming.

Next, the cylindrical preform 20 is loaded into the tool 30 shown in FIG. 2, a cross-section of which is schematically illustrated in FIG. 3. Referring to FIGS. 2-5, inside of this tool 30 is formed a female die 31 having the final shape of the outer face of the IFS barrel portion. The female die 31 may be made from a material with a very low coefficient of thermal expansion, such as a form of graphite, for example. A back sheet 24 may be coupled (e.g., welded) to the outer skin 22 of the preform 20 around its peripheral edges, and form with the outer skin 22 an enclosure 25 containing therein the inner skin 21 and the core grid 23, which is then evacuated of air. The tool 30 with the prepared preform is heated, for example in a vacuum furnace. The enclosure 25 may be evacuated of air.

When the titanium skins 21, 22 and the core 23 reach a temperature (e.g., a threshold temperature) suitable for super plastic forming, pressure is introduced through the insertion of a gas, such as an inert gas, into the enclosure 25. Either the core grid 23 must contain holes between all of the cells, or the inner skin 21 must be perforated in order for the pressure to equalize between all of the cells of the core grid 23, and on each side of the inner skin 21. A delta pressure difference will exist across the outer skin 22, causing the outer skin 22 to plastically deform and expand outward into the female die 31 until the outer skin 22 takes the shape of the die. The expansion and deformation of the back sheet 24 is blocked by an internal mandrel 32. As the outer skin 22 plastically deforms, it also deforms the core grid 23 and the inner skin 21 as they have all been previously strongly bonded together. The temperature at which this plastic deformation occurs is not high enough to overly limit the bond strength of the bonds between the inner skin 21, outer skin 22 and core grid 23. By applying pressure only to the outer skin 22, wrinkling or crushing of the core grid 23 is avoided. The tool and the materials are then allowed to cool before removal.

After this super plastic deforming step, the excess material around the edges/perimeter of the outer skin 22 may be trimmed away, and the back sheet 24 removed/decoupled to reach the final dimensions of the barrel section 11.

In an alternate embodiment, the cylindrical preform 20 may be bonded inside of the forming tool 30, before the preform is plastically deformed to its net shape as has been described above. In this case, the preformed inner skin 21 and outer skin 22 and the core grid 23 are positioned inside of the tool 30, with a back sheet 24 attached around its edges to the outer skin perimeter as previously described, and the enclosure 25 formed thereby is evacuated. Brazing foils or LID bonding foils will have been appropriately applied between the joints in a known manner. Then, as the tool and the cylindrical preform 20 are brought up to bonding temperature inside of the vacuum furnace, inert gas is introduced into the furnace environment to raise the pressure of air outside of the enclosure 25, the pressure differential acting to apply force between the inner and outer skins and the core grid for purposes of bonding. After the bonding step, the process is completed as explained above by next inflating the enclosure 25 and causing the outer skin 22 to plastically deform and expand against the die surface 31 to reach its net shape.

Figure 6:
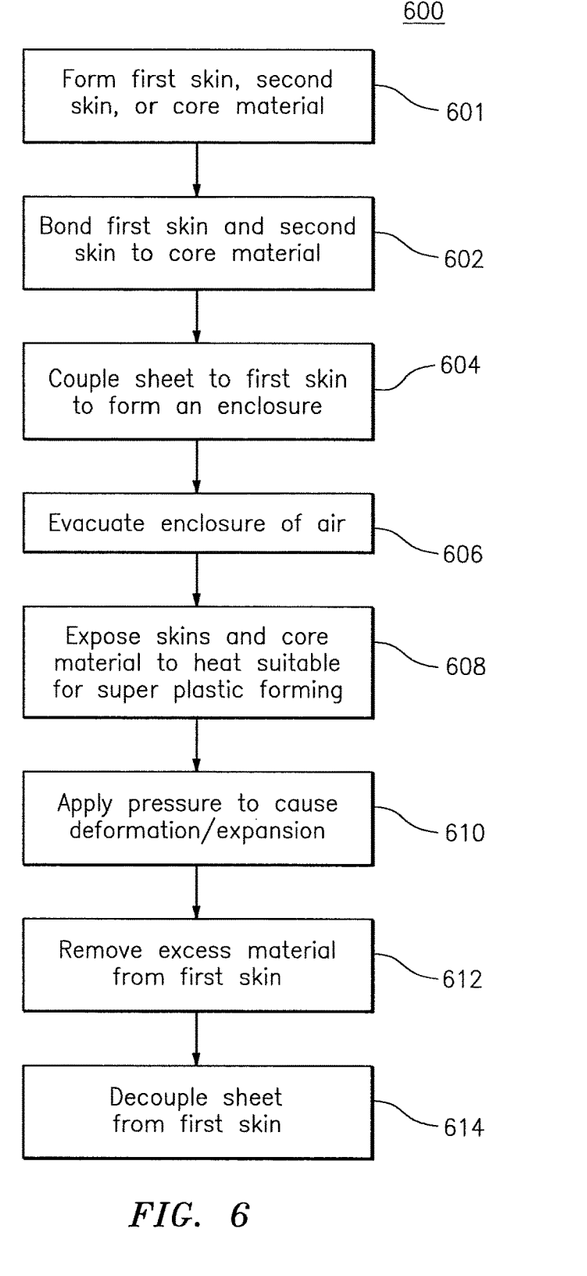
FIG. 6 is a flow chart of an exemplary method for forming a portion of an IFS.

Referring now to FIG. 6, a method 600 is shown. The method 600 may be used to form a barrel portion (e.g., barrel portion 11 of FIG. 1) of an IFS (e.g., IFS 10 of FIG. 1) of a thrust reverser.

In block 601, one or more of a first skin (e.g. outer skin 22), a second skin (e.g., inner skin 21) or a core material (e.g., core 23) may be formed. The formation of block 601 may be based on the use of one or more materials. For example, one or more of the first skin, the second skin, or the core material may be formed out of titanium in some embodiments.

In block 602, the first skin and the second skin may be bonded to/with the core material. The bonding of block 602 may occur inside a forming tool (e.g., tool 30) configured to cause the first skin to deform and expand to the shape of a die (e.g., die 31). Alternatively, the bonding may occur separate from the forming tool.

In block 604, a sheet (e.g., back sheet 24) may be coupled to the first skin to form an enclosure (e.g., enclosure 25) that contains the second skin and the core material.

In block 606, the enclosure of block 604 may be evacuated of air.

In block 608, the first skin, the second skin, and the core material may be exposed to heat. The applied heat may be selected to coincide with a threshold temperature suitable for super plastic forming.

In block 610, pressure may be applied when the heat applied in block 608 is suitable for super plastic forming. The applied pressure may cause a deformation or expansion of the first skin to the shape of the die.

As part of the transition from block 610 to 612, the heat of block 608 may be removed or turned off (if it wasn't removed or turned off previously) to allow for cooling to occur. In block 612, excess material from the first skin may be removed/trimmed.

In block 614, the sheet of block 604 may be decoupled from the first skin.

Technical effects and benefits of the disclosure include enhanced reliability and quality of an IFS. For example, a panel structure that includes skins and a core grid structure may be fabricated/manufactured via the application of heat and/or pressure to the panel structure, as opposed to applying the heat or pressure to each of the skins separately followed by an application of heat or pressure to the combination of the skins and the core grid structure. Accordingly, the number of heat and/or pressure cycles that are used in forming an IFS may be reduced.

While some of the examples described herein related to an IFS, aspects of the disclosure may be used to form any type of structure, such as a high temperature structure. In some embodiments, aspects of the disclosure may be used to form an engine exhaust structure, such as an exhaust nozzle. One or more methods may be utilized to form such structures.

Aspects of the disclosure have been described in terms of illustrative embodiments Thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A method comprising:
bonding a first skin and a second skin to a core material, wherein the core material comprises a honeycomb core;
coupling a sheet directly to the first skin to form with the first skin an enclosure between the sheet and the first skin, the second skin and the core material arranged within the enclosure and between the sheet and the first skin;
exposing the first skin, the second skin, and the core material to heat; and
based on the exposition of heat, applying pressure via the enclosure to the first skin to cause the first skin to deform and expand to a shape of a die.

2. The method of claim 1, wherein the pressure is applied when the first skin, the second skin, and the core material reach a threshold temperature suitable for super plastic forming.

3. The method of claim 1, wherein the pressure is applied through the insertion of an inert gas into the enclosure.

4. The method of claim 1, wherein at least one of the core material includes holes between cells or the second skin is perforated.

5. The method of claim 1, wherein the heat is applied using a vacuum furnace.

6. The method of claim 1, further comprising:
removing excess material from a perimeter of the first skin; and
decoupling the sheet from the first skin.

7. The method of claim 1, wherein the bonding comprises at least one of welding, brazing, or diffusion bonding.

8. The method of claim 1, wherein the bonding occurs inside a forming tool configured to cause the first skin to deform and expand to the shape of the die, the method further comprising:
raising the pressure of air outside of the enclosure to bond the first and second skins and the core material.

9. The method of claim 1, further comprising forming a barrel portion for an inner fixed structure of a thrust reverser, wherein the barrel portion comprises the first skin, the second skin and the core material.

10. The method of claim 9, further comprising bonding bifurcation panels to the barrel portion.

11. The method of claim 1, further comprising:
evacuating the enclosure of air.

12. The method of claim 11, wherein the evacuation of the enclosure occurs prior to the exposition of heat.

13. The method of claim 1, further comprising:
forming at least one of the first skin, the second skin, or the core material out of titanium.

14. The method of claim 1, further comprising:
forming the first skin, the second skin, and the core material out of titanium.

15. A method, comprising:
bonding a first skin and a second skin to a core material, wherein the core material comprises a plurality of cavities that extend completely through the core material between the first skin and the second skin;
coupling a sheet to the first skin to form with the first skin an enclosure in which the second skin and the core material are positioned, wherein the second skin and the core material are between the first skin and the sheet, and the coupling between the sheet and the first skin is independent of the second skin and the core material;
heating the first skin, the second skin and the core material; and
applying pressure via the enclosure to the first skin to cause the first skin to deform and expand to a shape of a die, wherein the die contacts the first skin.

16. The method of claim 15, further comprising decoupling the sheet from the first skin after the applying pressure via the enclosure to the first skin.

17. The method of claim 15, wherein the core material includes holes between cells.

18. The method of claim 15, wherein
the core material is vertically between the first skin and the second skin; and
the second skin comprises a plurality of perforations, and each of the plurality of perforations extends vertically through the second skin.

19. The method of claim 15, wherein the sheet is coupled directly to the first skin.

* * * * *